United States Patent
Ladurini et al.

(10) Patent No.: US 10,297,964 B2
(45) Date of Patent: May 21, 2019

(54) MEMORY DEVICE HAVING FIRST AND SECOND PARTS

(71) Applicant: Sikorsky Aircraft Corporation, Stratford, CT (US)

(72) Inventors: Aaron Ladurini, Milford, CT (US); Thomas Guido, Stormville, NY (US); John Malcolm Burdis, Naugatuck, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/522,652

(22) PCT Filed: Sep. 18, 2015

(86) PCT No.: PCT/US2015/050963
§ 371 (c)(1),
(2) Date: Apr. 27, 2017

(87) PCT Pub. No.: WO2016/081059
PCT Pub. Date: May 26, 2016

(65) Prior Publication Data
US 2017/0331239 A1 Nov. 16, 2017

Related U.S. Application Data

(60) Provisional application No. 62/081,822, filed on Nov. 19, 2014.

(51) Int. Cl.
*H01R 31/06* (2006.01)
*H01R 13/74* (2006.01)
(Continued)

(52) U.S. Cl.
CPC ....... *H01R 31/06* (2013.01); *G06K 19/07732* (2013.01); *H01R 13/447* (2013.01);
(Continued)

(58) Field of Classification Search
CPC ........ H01R 13/74; H01R 31/06; H01R 24/62; G06K 19/07732
See application file for complete search history.

(56) References Cited

U.S. PATENT DOCUMENTS 6,932,276 B1 * 8/2005 Liu ..................... B43K 29/093
235/486
6,999,322 B1 2/2006 Lin
(Continued)

FOREIGN PATENT DOCUMENTS

| CN | 201910976 U | 7/2011 |
| CN | 202167244 U | 3/2012 |
| WO | 03063174 A1 | 7/2003 |

OTHER PUBLICATIONS

International Search Report and Written Opinion of the International Search Authority dated Dec. 18, 2015 in related PCT Application No. PCT/US2015/050963, 8 pages.
(Continued)

*Primary Examiner* — Briggitte R Hammond
(74) *Attorney, Agent, or Firm* — Cantor Colburn LLP

(57) ABSTRACT

A memory device includes first and second parts. The first part includes a plug receiver configured for reception of a plug and a head coupled to the plug receiver. The second part includes a cap end and a dummy socket coupled to the cap end. The dummy socket includes a first portion insertible into the plug receiver and a second portion configured for reception of the head. The cap end is configured for placement thereon of a cap, which is disposable over the plug.

9 Claims, 3 Drawing Sheets

(51) Int. Cl.
*G06K 19/077* (2006.01)
*H01R 13/447* (2006.01)
*H01R 24/62* (2011.01)
*H01R 13/64* (2006.01)
*B65D 55/16* (2006.01)

(52) U.S. Cl.
CPC ............ *H01R 13/74* (2013.01); *H01R 24/62* (2013.01); *B65D 55/16* (2013.01); *H01R 13/64* (2013.01); *H01R 2201/26* (2013.01)

(56) References Cited

U.S. PATENT DOCUMENTS

| | | | |
|---|---|---|---|
| 7,029,193 B1* | 4/2006 | Chao | F21L 4/005 |
| | | | 362/118 |
| 7,153,148 B2 | 12/2006 | Chen et al. | |
| 7,214,075 B2 | 5/2007 | He et al. | |
| 7,341,464 B2 | 3/2008 | Cuellar et al. | |
| 7,416,424 B1 | 8/2008 | Deckman | |
| 7,448,905 B1* | 11/2008 | Lin | A61J 1/03 |
| | | | 206/537 |
| 7,503,780 B1 | 3/2009 | Huang | |
| 7,568,942 B1 | 8/2009 | Lannon et al. | |
| 7,713,082 B2* | 5/2010 | Lin | F16B 45/02 |
| | | | 439/490 |
| 2004/0095829 A1* | 5/2004 | Barnbrook | G06K 19/07 |
| | | | 365/222 |
| 2004/0233629 A1* | 11/2004 | Wang | B43K 29/08 |
| | | | 361/679.4 |
| 2005/0070138 A1 | 3/2005 | Chiou et al. | |
| 2008/0020633 A1 | 1/2008 | Montgomery et al. | |
| 2008/0064271 A1 | 3/2008 | Hiew et al. | |
| 2008/0189486 A1* | 8/2008 | Nguyen | G06F 12/1416 |
| | | | 711/115 |
| 2014/0328076 A1 | 11/2014 | Firman, II | |

OTHER PUBLICATIONS

Supplementary Partial European Search Report dated Jul. 26, 2018 in related PCT Application No. PCT/US2015/0505963, 9 pages.

* cited by examiner

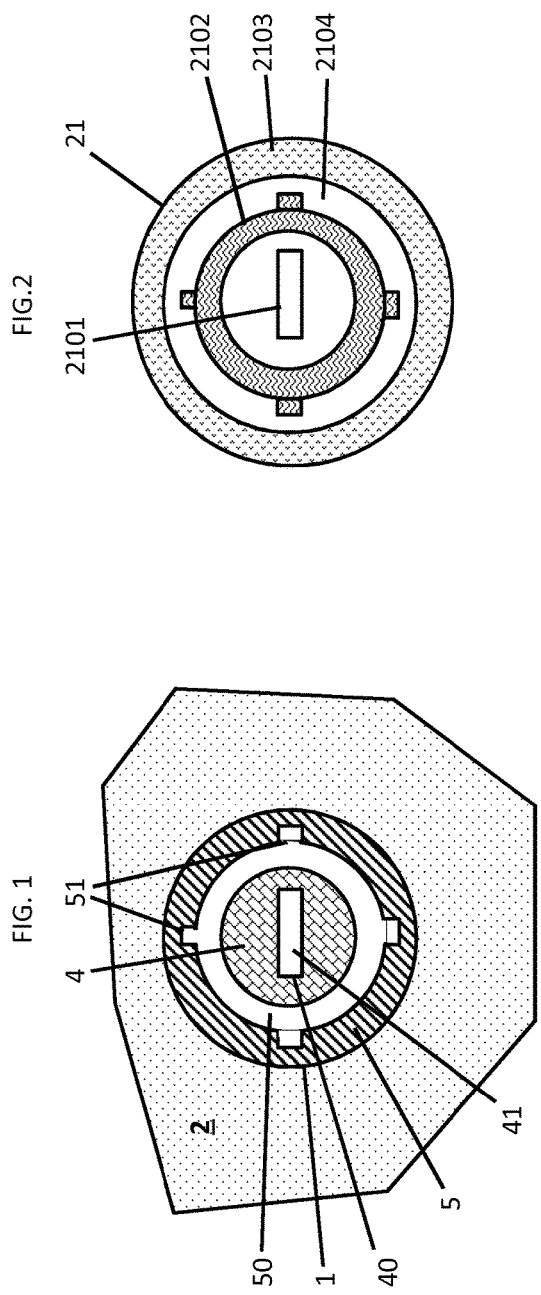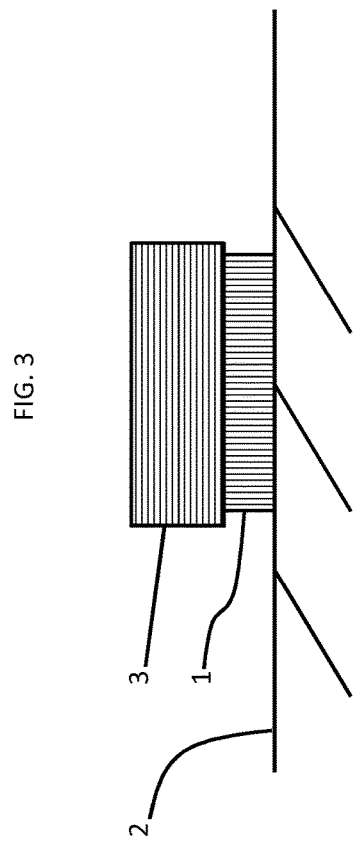

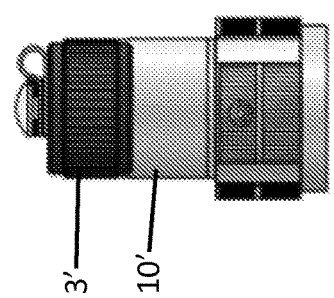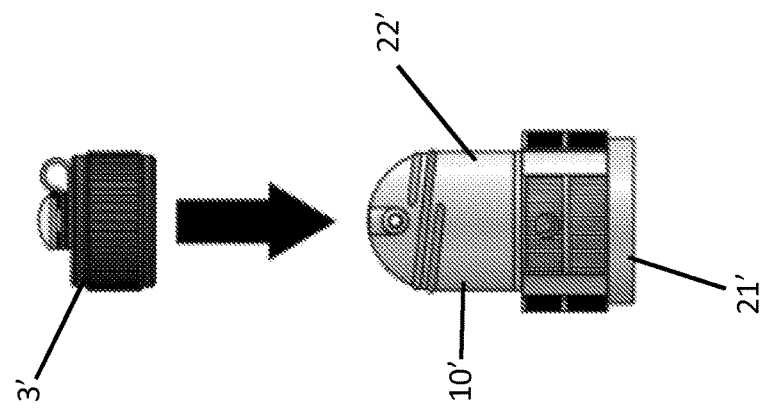

MEMORY DEVICE HAVING FIRST AND SECOND PARTS

CROSS-REFERENCE TO RELATED APPLICATIONS

The present application is a 371 National Stage of International Patent Application No. PCT/US2015/050963, filed on Sep. 18, 2015, which claims priority to U.S. Provisional Application No. 62/081,822, filed on Nov. 19, 2014, the contents of which are incorporated herein by reference in their entirety.

FEDERAL RESEARCH STATEMENT

This invention was made with government support under TUHP, TAA 3604-09A. The government has certain rights in the invention.

BACKGROUND OF THE INVENTION

The subject matter disclosed herein relates to memory devices and, more particularly, to universal serial bus (USB) memory devices having first and second parts.

Modern aircraft, such as helicopters and other rotorcraft, often include a panel within the cockpit or cabin. This panel includes various information gages and control elements including, but not limited to, a panel plug having a universal serial bus (USB) connector to which a corresponding USB memory device may be connected. This memory device can be used to carry information vital to aircraft flight controls and/or other aircraft operations and needs to be connected to the panel plug for the aircraft to be operable.

Since the connection between the USB memory device and the panel plug is important, when the connection is not made the panel plug is normally capped by a cap that protects the plug and prevents ingress of dust and/or sand into the plug components. The cap may be uncoupled to the panel or coupled to the panel by loose, flexible wiring that allows the cap to be easily removed from or secured to the plug. In either case, when the cap is removed from the plug, it is relatively unsecured within the cockpit or cabin.

In a similar fashion, the USB memory device has components that also should be protected from the environment. Thus, any protective element used for the USB memory device will also be relatively unsecured within the cockpit or cabin when the USB memory device is connected to the panel plug.

BRIEF DESCRIPTION OF THE INVENTION

According to one aspect of the invention, a memory device includes first and second parts. The first part includes a plug receiver configured for reception of a plug and a head coupled to the plug receiver. The second part includes a cap end and a dummy socket coupled to the cap end. The dummy socket includes a first portion insertible into the plug receiver and a second portion configured for reception of the head. The cap end is configured for placement thereon of a cap, which is disposable over the plug.

In addition to one or more of the features described above, or as an alternative, the plug receiver includes a male universal serial bus (USB) element compatible with a female USB element of the plug.

In addition to one or more of the features described above, or as an alternative, the plug receiver includes inner and outer tubular members.

In addition to one or more of the features described above, or as an alternative, the plug receiver includes a first grip element.

In addition to one or more of the features described above, or as an alternative, the second part includes a second grip element.

In addition to one or more of the features described above, or as an alternative, the head and the second portion include complementary connection features.

In addition to one or more of the features described above, or as an alternative, the complementary connection features of the head and the second portion respectively include inner and outer threading.

In addition to one or more of the features described above, or as an alternative, respective outer surfaces of the cap end and the plug include similar connection features.

In addition to one or more of the features described above, or as an alternative, the similar connection features complement corresponding connection features of the cap.

In addition to one or more of the features described above, or as an alternative, the similar connection features of the cap end and the plug and the corresponding connection features of the cap respectively include inner and outer threading.

According to another aspect of the invention, a universal serial bus (USB) memory device is provided for use with a normally capped panel plug. The USB memory device includes a plug receiver configured for reception of the panel plug with the panel plug uncapped and a head coupled to and opposite the plug receiver, the head being configured for placement thereon of the cap.

In addition to one or more of the features described above, or as an alternative, the plug receiver includes inner and outer tubular members and an outer diameter portion having a grip element.

In addition to one or more of the features described above, or as an alternative, respective outer surfaces of the plug receiver and the panel plug include similar connection features.

In addition to one or more of the features described above, or as an alternative, the similar connection features complement corresponding connection features of the cap.

In addition to one or more of the features described above, or as an alternative, the similar connection features of the plug receiver and the panel plug and the corresponding connection features of the cap respectively include inner and outer threading.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 1 is an axial view of a panel plug in accordance with embodiments;

FIG. 2 is an axial view of a plug receiver of a memory device in accordance with embodiments;

FIG. 3 is a side view of a cap and the panel plug of FIG. 1;

FIG. 5A is a side view of a memory device and the cap of FIG. 3; and

FIG. 5B is a side view of the memory device with the cap connected thereto.

Figures 4A, 4B, 4C:
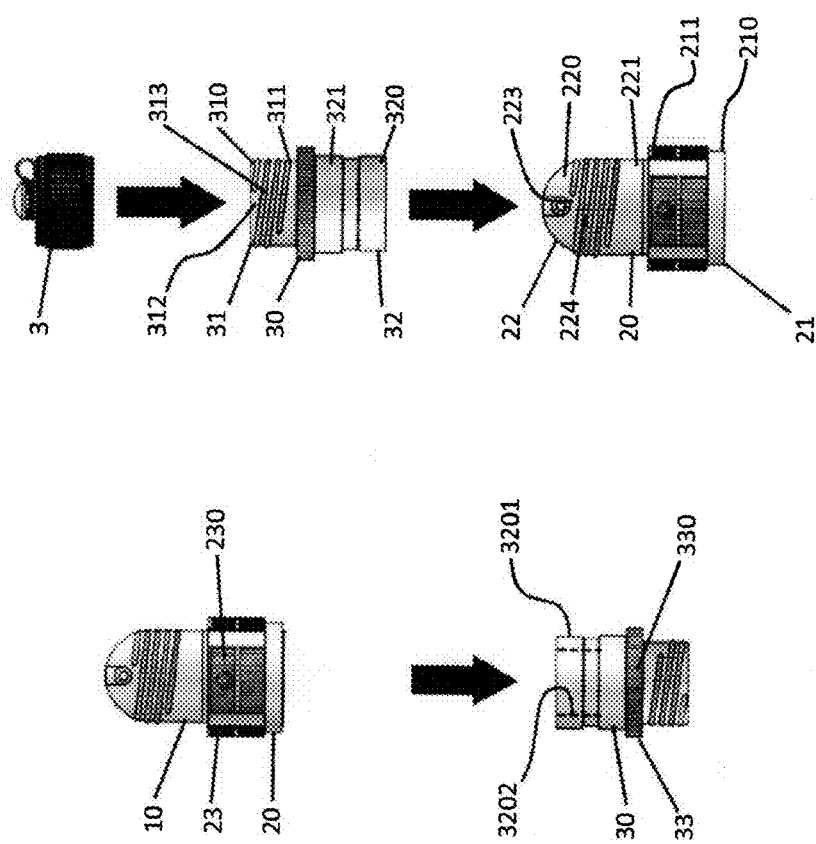
FIG. 4A is a side view of a memory device with a second part removed from a first part.
FIG. 4B is a side view of the second part being reconnected to the first part and the cap of FIG. 3.
FIG. 4C is a side view of a reconfiguration of the memory device with the cap connected thereto.

The detailed description explains embodiments of the invention, together with advantages and features, by way of example with reference to the drawings.

DETAILED DESCRIPTION OF THE INVENTION

As will be described below, a universal serial bus (USB) memory device is provided for use with a panel plug of an aircraft, for example. The USB memory device includes protective elements that protect the USB connectors on the USB memory device and allows for a connection of the panel plug cap to either the USB memory device or the protective elements.

With reference to FIGS. 1-3, 4A, 4B and 4C, a memory device 10 is provided. The memory device 10 includes a first part 20 and a second part 30 (see FIGS. 4A, 4B and 4C). The memory device 10 may be provided as a universal serial bus (USB) memory device and may be configured to be connected to a plug 1 of a panel 2 (see FIGS. 1 and 3). The panel 2 can be a control panel of an aircraft, for example, and is substantially planar such that the plug 1 protrudes away from a plane of the panel 2. Where the panel 2 is a control panel of an aircraft, the memory device 10 may be used to carry information vital to aircraft flight controls and/or other aircraft operations.

When the memory device 10 is not connected to the plug 1, the plug 1 may be capped by a cap 3 (see FIG. 3). The cap 3 serves to protect the plug 1 and prevents ingress of debris, such as dust, sand and other foreign objects, from entering openings defined in the plug 1. These opening will be described in greater detail below. The cap 3 may include an interior facing surface that connects with an exterior facing surface of the plug 1. This connection may be provided by inner and outer threading respectively disposed on the exterior facing surface of the plug 1 (i.e., the exterior facing surface of an outer body 5 of the plug 1 to be described below) and the interior facing surface of the cap 3.

As shown in FIG. 1, the plug 1 includes a center body 4 and the above-mentioned outer body 5. The center body 4 may be provided as a female USB element 40 and is formed to define a space 41 therein. This space 41 may have a substantially rectangular cross-sectional shape. The outer body 5 radially surrounds and is displaced from the center body 4 to define a first annulus 50. The outer body 5 may also include keying features 51 to facilitate connections of the plug 1 with the memory device 10.

As shown in FIG. 4B, the first part 20 of the memory device 10 is an elongate element and includes at a first end thereof a plug receiver 21 and at a second end thereof a head 22. The plug receiver 21 has a first side 210 configured for reception of the plug 1 in an event the plug 1 is uncapped and a second side 211 opposite the first side 210. In a similar fashion, the head 22 has a first side 220 and a second side 221 opposite the first side 220. The second side 221 of the head 22 is coupled to the second side 211 of the plug receiver 21 such that the respective first sides 210, 220 of the plug receiver 21 and the head 22 are opposite one another.

As shown in FIG. 2, at least the first side 210 of the plug receiver 21, which is configured for reception of the plug 1, includes a male USB element 2101, an inner tubular member 2102 disposed about the male USB element 2101 and an outer tubular member 2103 radially surrounding the inner tubular member 2102 to define a second annulus 2104. When the first side 210 of the plug receiver 21 receives the plug 1, the male USB element 2101 occupies the space 41 defined by the female US element 40, the inner tubular member 2102 is disposed within the first annulus 50 and the outer tubular member 2103 radially surrounds the outer body 5 of the plug 1 with the outer body 5 disposed within the second annulus 2104.

In accordance with embodiments, an outer surface of the inner tubular member 2102 may be keyed in accordance with the keying features 51 of the outer body 5. Also, in surrounding the outer body 50 of the plug 1, the outer tubular member 2103 has an inner diameter that is large enough to encompass the inner threading disposed on the exterior facing surface of the outer body 5. In particular, the outer tubular member 2103 has an inner diameter that is large enough to tightly encompass this inner threading.

In addition, the plug receiver 21 may include an outer diameter portion 23 having a first grip element 230 (see FIG. 4A). In accordance with embodiments, the first grip element 230 may have a hexagonal or polygonal shape with relatively small exterior facing grooves aligned along or transverse to a longitudinal length of the first part 20 of the memory device 10. A longitudinal length of the first grip element 230 may extend along a substantial entirety of the plug receiver 21.

As shown in FIG. 4B, the second part 30 of the memory device 10 is an elongate element and includes at a first end thereof a cap end 31 and at a second end thereof a dummy socket 32. The cap end 31 has a first side 310 and a second side 311 and, in a similar fashion, the dummy socket 32 has a first side 320 and a second side 321. The second side 321 of the dummy socket 32 is coupled to the second side 311 of the cap end 31 such that the respective first sides 310, 320 of the cap end 31 and the dummy socket 32 are opposite one another.

As shown in FIG. 4A, the first side 320 of the dummy socket 32 includes a first (or an outer diameter) portion 3201 and a second (or an inner diameter) portion 3202. The outer diameter portion 3201 is insertible into the plug receiver 21 in an event that the plug 1 is not received therein. During such insertion, the outer diameter portion 3201 fits within the outer tubular member 2103. Thus, when the memory device 10 is not in use, the second part 30 serves to protect the male USB element 2101 from ingress of dust and sand or other foreign objects. The inner diameter portion 3202 is configured for reception of the head 22 in an event the outer diameter portion 3201 is not inserted into the plug receiver 21 (as shown for example in FIG. 4B). The first side 310 of the cap end 31 is configured to have the cap 3, which is disposable over the plug 1, placed thereon.

The second part 30 may also include a central outer diameter portion 33 having a second grip element 330 interposed between the cap end 31 and the dummy socket 32. In accordance with embodiments, the second grip element 330 may have a hexagonal or polygonal shape with relatively small exterior facing grooves aligned along or transverse to a longitudinal length of the second part 30 or in parallel with the grooves of the first grip element 230.

In accordance with embodiments, an outer surface 223 of the first side 220 of the head 22 may include connection features 224 and the inner diameter portion 3202 of the first side of the dummy socket 32 may include complementary connection features. In accordance with embodiments, the connection features 224 and the complementary connection features may be provided as inner and outer threading such that a connection between the head 22 and the dummy socket 32 can be secured especially with the plug receiver 21 disposed to receive the plug 1. That is, with the plug receiver 21 disposed to receive the plug 1, the dummy socket 32 is removed from the plug receiver 21 and can be securely fastened to the head 22 in lieu of being unsecured within, for example, an aircraft cabin.

In accordance with further embodiments, the cap end 31 of the second part 30 of the memory device 10 has an outer surface 312 on which connection features 313 are disposed. These connection features 313 may be similar to those of the exterior facing surface of the outer body 5 of the plug 1. That is, the connection features 313 may be provided as inner threading that complements the outer threading of the interior facing surface of the cap 3. Thus, with the cap 3 removed from the plug 1 and with the dummy socket 32 either received in the plug receiver 21 or fastened to the head 22, the cap 3 may be securely disposed over the cap end 31 in lieu of being unsecured within, for example, the aircraft cabin.

With the configurations described above, a method of using the memory device 10 with the plug 1 will now be described. At an initial instance, the cap 3 is removed from the plug 1 by rotation of the cap 3 in accordance with the direction of the plug-cap threading. Also, the second part 30 of the memory device 10 may be removed from the first part 20 by withdrawing the dummy socket 32 out of the second annulus 2104. Next, the first part 20 may be installed on the panel 2 by having the plug receiver 21 receive the plug 3 such that the male USB element 2101 occupies the space 41 defined within the female USB element 40, the inner tubular member 2102 is disposed within the first annulus 50 and the outer tubular member 2103 radially surrounds the outer body 5 of the plug 1 with the outer body 5 disposed within the second annulus 2104. Also, the second part 30 may be installed on the head 22 by disposing the inner diameter portion 302 of the dummy socket 32 on the head 22 and rotating the second part 30 in accordance with the head-dummy socket threading or otherwise engaging connection features 224 of the head 22 with the complementary connection features of the inner diameter portion 3202. Finally, the cap 3 may be installed on the second part 30 by disposing the interior facing surface of the cap 3 on the outer surface 312 of the cap end 31 and rotating the cap 3 in accordance with the cap end-cap threading or otherwise engaging the connection features 313 of the cap end 31 with the complementary connection features of the interior facing surface of the cap 3.

In accordance with further aspects of the invention and, as shown in FIGS. 5A and 5B, a USB memory device 10' may be provided for use with a normally capped panel plug. The panel plug and the USB memory device 10' include many features similar to those described above and thus descriptions of those features will be omitted.

As shown in FIGS. 5A and 5B, the USB memory device 10' includes a plug receiver 21', which is configured for reception of the panel plug with the panel plug uncapped, and a head 22'. The head 22' is coupled to and opposite the plug receiver 21' and is configured such that the cap 3' can be placed upon and secured to the head 22' (without the interposition of the above-described second part 30) in lieu of the cap 3' being unsecured within, for example, the aircraft cabin.

Although the various connection features are described above and illustrated in the drawings as being provided as inner and outer threading, it will be understood that this embodiment is merely exemplary and is not required. Indeed, any one or more of the various connection features may have alternative structures that need not correspond to those of the other connection features. For example, where inner and outer threading is provided for the plug-cap interface and for the cap end-cap interface, the connection features of the head-dummy socket interface may be provided as a keying element, some other suitable mechanical interference element or a frictional engagement.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A memory device, comprising: a first part including a plug receiver configured for reception of a plug and a head coupled to the plug receiver, the head including a first plurality of external connection features: a second part including a cap end including a second plurality of external connection features and a dummy socket coupled to the cap end, the dummy socket comprising a first portion insertable into the plug receiver and a second portion having a plurality of internal connection features that selectively receive the first plurality of external connection features on the head: and a cap mounted to the cap end through the second plurality of external connection features.

2. The memory device according to claim 1, wherein the plug receiver comprises a male universal serial bus (USB) element compatible with a female USB element of the plug.

3. The memory device according to claim 1, wherein the plug receiver comprises inner and outer tubular members.

4. The memory device according to claim 1, wherein the plug receiver comprises a first grip element.

5. The memory device according to claim 1, wherein the second part comprises a second grip element.

6. The memory device according to claim 1, wherein the complementary first plurality of outer connection features of the head and the plurality of inner connection features of the second portion respectively comprise inner and outer threading.

7. The memory device according to claim 1, wherein respective outer surfaces of the cap end and the plug comprise similar connection features.

8. The memory device according to claim 7, further comprising: a cap, wherein the similar connection features complement corresponding connection features of the cap.

9. The memory device according to claim 8, wherein the similar connection features of the cap end and the plug and the corresponding connection features of the cap respectively comprise inner and outer threading.

* * * * *